(12) United States Patent
Lowe

(10) Patent No.: US 12,265,556 B1
(45) Date of Patent: Apr. 1, 2025

(54) APPARATUS AND METHOD FOR CLASSIFYING AN ENTITY TO AN EXECUTABLE DATA STRUCTURE

(71) Applicant: AFIP Media Inc., Leduc (CA)

(72) Inventor: Jayson Lowe, Leduc (CA)

( * ) Notice: Subject to any disclaimer, the term of this patent is extended or adjusted under 35 U.S.C. 154(b) by 0 days.

(21) Appl. No.: 18/367,685

(22) Filed: Sep. 13, 2023

(51) Int. Cl.
*G06F 16/28* (2019.01)
*G06F 16/22* (2019.01)

(52) U.S. Cl.
CPC ............ *G06F 16/287* (2019.01); *G06F 16/22* (2019.01)

(58) Field of Classification Search
CPC ................................ G06F 16/287; G06F 16/22
See application file for complete search history.

(56) References Cited

U.S. PATENT DOCUMENTS

| | | | |
|---|---|---|---|
| 2002/0019791 A1 | 2/2002 | Goss | |
| 2012/0101852 A1* | 4/2012 | Albert | G06Q 40/08 705/4 |
| 2013/0036073 A1 | 2/2013 | Kiger | |
| 2021/0112178 A1* | 4/2021 | Perone | G06N 3/044 |
| 2023/0070467 A1 | 3/2023 | Lim | |
| 2023/0412530 A1* | 12/2023 | Schuetz | G06N 3/045 |
| 2024/0020771 A1* | 1/2024 | Bloom | G06Q 40/128 |

* cited by examiner

*Primary Examiner* — Etienne P Leroux
*Assistant Examiner* — Husam Turki Samara
(74) *Attorney, Agent, or Firm* — Caldwell Intellectual Property Law

(57) ABSTRACT

An apparatus for classifying an entity to an executable data structure, the apparatus including a processor and a memory communicatively connected to the processor, the memory containing instructions configuring the processor to receive entity input from an entity using a graphical user interface, wherein receiving the entity data includes receiving a low-level entity data at a first time and receiving a high-level entity data at a subsequent time determine a degree of interaction pertaining to the entity by comparing the low-level entity data to the high-level entity data, identify at least a protocol metric as a function of the degree of interaction, determine a protocol object as a function of the high-level entity data and the at least a protocol metric, establish an executable data structure for the entity as a function of the protocol object and display the executable data structure using the graphical user interface.

14 Claims, 8 Drawing Sheets

APPARATUS AND METHOD FOR CLASSIFYING AN ENTITY TO AN EXECUTABLE DATA STRUCTURE

FIELD OF THE INVENTION

The present invention generally relates to the field of executable data structures. In particular, the present invention is directed to an apparatus and method for classifying a user to an executable data structure.

BACKGROUND

There are many types of executable data structures, for example the executable data structure may represent the data for a life insurance policy coverage plan. Unfortunately, there is a lack of efficient and tailored executable data structures which contain data for executable data structures to meet many people's unique needs. It is particularly difficult to find executable data structures which specialize in the placement of dividend-paying participating whole life plans.

SUMMARY OF THE DISCLOSURE

In an aspect, an apparatus for classifying an executable data structure, the apparatus including a processor and a memory communicatively connected to the processor, the memory containing instructions configuring the processor to receive entity input from an entity using a graphical user interface, wherein receiving the entity input includes receiving a low-level entity data at a first time and receiving a high-level entity data at a subsequent time, determine a degree of interaction pertaining to the entity by comparing the low-level entity data to the high-level entity data and identify at least a protocol metric as a function of the degree of interaction, determine a protocol object as a function of the low-level entity data and the at least a protocol metric, establish an executable data structure for the entity as a function of the protocol object and display the executable data structure using the graphical user interface.

In another aspect, a method for classifying an entity to an executable data structure, the method including receiving, by a processor, entity input from an entity using a graphical user interface, wherein receiving the entity input includes receiving a low-level entity data at a first time and receiving a high-level entity data at a subsequent time, determining, by the processor, a degree of interaction pertaining to the entity by comparing the low-level entity data to the high-level entity data, identifying, by the processor, a protocol metric as a function of the degree of interaction, determining, by the processor, a protocol object as a function of the low-level entity data and the protocol metric and establishing, by the processor, an executable data structure for the entity as a function of the protocol object and displaying the executable data structure using the graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods that classify an entity to an executable data structure. Aspects of the present disclosure may consider an entity's pecuniary records, family records, and the like to generate a tailored executable data structure with various benefits.

Aspects of the present disclosure can be used to help entities in the life insurance field by matching them with a tailored executable data structure which contains the data of a life insurance coverage policy. The executable data structure may also include data for access to a client portal which provides continued education and guidance regarding the executable data structure. Exemplary embodiments illustrating aspects of the present disclosure are described below in the context of several specific examples.

Figure 1:
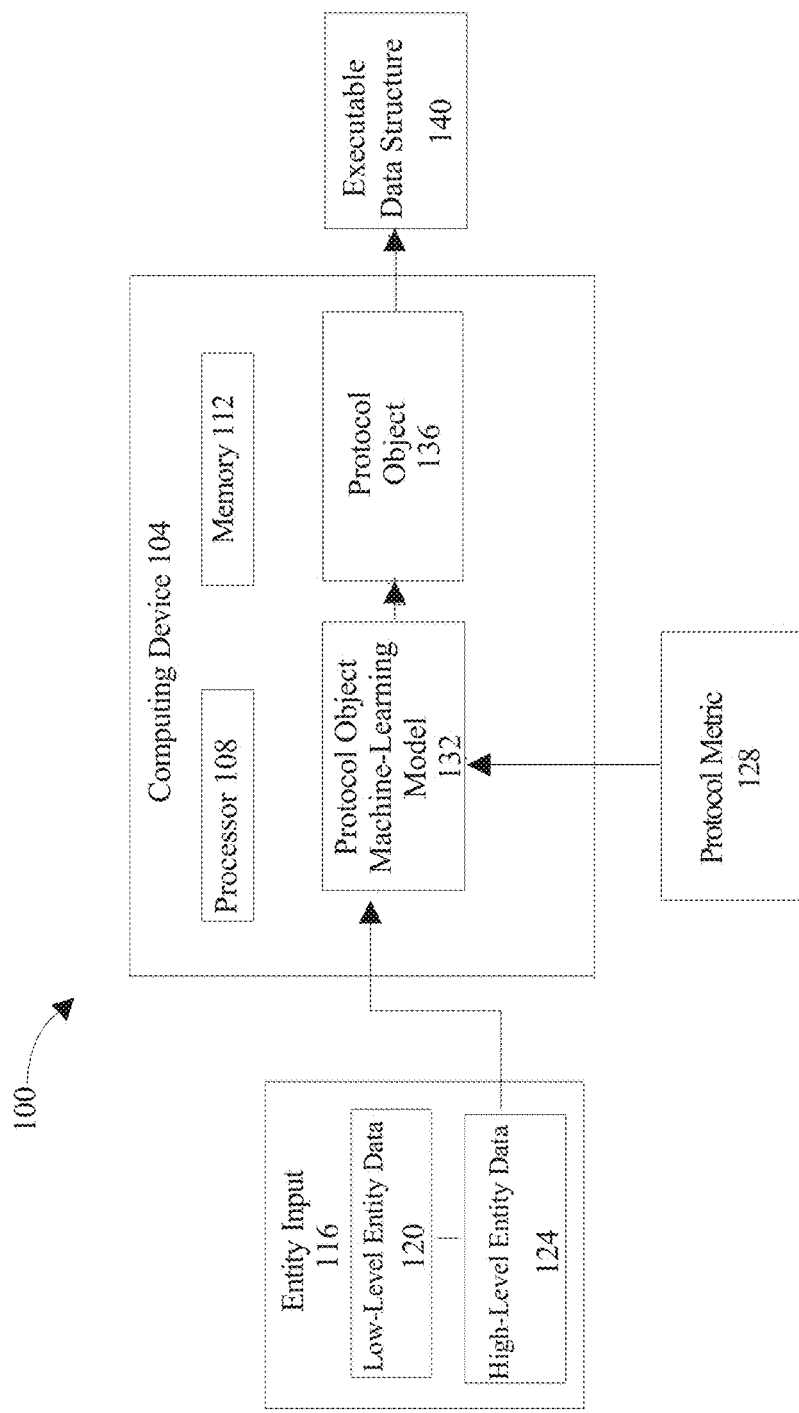
FIG. 1 is a block diagram of an exemplary embodiment of an apparatus for classifying an entity to an executable data structure.

Referring now to FIG. 1, Apparatus 100 may include, be included in, and/or be a computing device 104. Computing device 104 may include a processor 108. Processor 108 may include any processor incorporated in any computing device as described in this disclosure, including without limitation a microcontroller, microprocessor, digital signal processor (DSP) and/or system on a chip (SoC) as described in this disclosure. Processor and/or computing device may include, be included in, and/or communicate with a mobile device such as a mobile telephone or smartphone. A computing device incorporating processor 108 may include a single computing device operating independently, or may include two or more computing device operating in concert, in parallel, sequentially or the like; two or more computing devices may be included together in a single computing device or in two or more computing devices. Processor 104 and/or computing device may interface or communicate with one or more additional devices as described below in further detail via a network interface device. Network interface device may be utilized for connecting processor 108 and/or computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device including processor 108 may include but is not limited to, for example, a computing device or cluster of computing devices in a first location and a second computing device or cluster of computing devices in a second location. A computing device including processor 108 may include one or more computing devices dedicated to data storage, security, distribution of traffic for load balancing, and the like. A computing device including processor 108 may distribute one or more computing tasks as described below across a plurality of computing devices of computing device, which may operate in parallel, in series, redundantly, or in any other manner used for distribution of tasks or memory between computing devices. A computing device including processor 108 may be implemented using a "shared nothing" architecture in which data is cached at the worker, in an embodiment, this may enable scalability of apparatus 100 and/or computing device.

With continued reference to FIG. 1, processor 108 and/or computing device may be designed and/or configured to perform any method, method step, or sequence of method steps in any embodiment described in this disclosure, in any order and with any degree of repetition. For instance, processor 108 and/or computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 108 and/or computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, apparatus 100 includes a memory 112, which may be implemented in any manner suitable for a primary and/or secondary memory described in this disclosure. Memory 112 may include instructions configuring processor 108 to perform various tasks. In some embodiments, apparatus 100 may include a computing device 104, where computing device includes processor 108 and/or memory 112. Memory 112 may be communicatively connected to processor 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 is configured to receive an entity input 116 from an entity. "Entity" as used in this disclosure is defined as a user. For example, the user may be a prospective client such as a person seeking a life insurance coverage policy. A user may be a current client such as personal already enrolled in a life insurance coverage policy. In some embodiments, apparatus 100 may receive entity input 116 from one or more external computing devices. An "external computing device" as used in this disclosure is defined as any a computing device that is distinct from apparatus 100 and/or computing device. An external computing device may include any computing device as described in this disclosure, such as a user device A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. An "entity input", as used in this disclosure, is a form of data entry received from an individual/user and/or group of individuals, such as an individual and/or group of individuals that is using and/or interacting with apparatus 100. Entity input 116 may include, but is not limited to, low-level entity data 120 and high-level entity data 124. "Low-level entity data" as used in this disclosure is defined as general background information of an entity or user. "Background information" as used in this disclosure is defined as the total of a person's experience and education including a collection of granular data elements each containing a contextual attribute, property of a characteristic associated with an entity/user outside a "Client Eco-System". "Client Eco-System" as used in this disclosure is defined as the system the user/entity is able to view and participate in once they are enrolled as a client. In an embodiment, the low-level entity data 120 may include data regarding an entity's current life insurance coverage metric and/or life insurance cover policy history. For example, and without limitation, low-level entity data may contain information related to identification of an entity/user such as name, life insurance policy coverage status, background entity information, date of birth, age, height, weight, sex, ethnicity, address, education credentials and the like.

With continued reference to FIG. 1, in an embodiment, the Client Eco-System may include a digital environment, such as a digital platform. A "digital environment," for the purpose of this disclosure is an integrated communications environment where digital devices communicate and manage data and interactions within the digital environment. Digital device may be any computing device as described in this disclosure, for example as described in FIG. 8 below. For example, a digital environment may include an online marketplace, payment gateway, digital devices, digital tools, digital platforms and the like. Any processing step described in this disclosure may be performed in a digital environment. For example, the digital environment may be one of a computer system, computer network, and the like. In an exemplary embodiment, the digital environment may include a plurality of user devices. The digital environment may be connected to processor 104 by a network. Digital environment may employ any type of network architecture. For example, the digital environment may employ a peer to peer (P2P) architecture where each computing device in a computing network is connected with every computing device in the network and every computing device acts as a server for the data stored in the computing device. In a further exemplary embodiment, the digital environment may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, the digital environment may employ a mesh topology where a computing device is connected to one or multiple other computing devices using point to point connections. However, the network topology is not limited thereto. One skilled in the art will recognize the various network architectures that may be employed by the digital environment.

Still referring to FIG. 1, apparatus 100 may be configured to receive entity input 116 data from an entity using a graphical user interface, wherein receiving the entity data may include receiving a low-level entity data 120 at a first time and receiving a high-level entity data 124 at a subsequent time. For example, subsequent time may be a time when the entity has been introduced into the "Client Eco-System" and guided through the online platform. In an embodiment, apparatus 100 may further be configured to determine a degree of interaction pertaining to the entity by comparing the low-level entity data to the high-level entity data 124. "Degree of interaction," as used in this disclosure, is defined as the level of engagement the entity/user has with the resources available. A "resource" as used in this disclosure is defined assets, capabilities or other components which are available to the entity in the Client Eco-System. For example, a resource may include digital assets containing education material related to insurance policy coverage plans. For example, a resource may be an online newsletter, an educational online quiz and the like. In an embodiment, the degree of interaction may be the amount of time an entity spends using the resources available, the amount of time the entity spends scrolling through the resources available, the number of times the entity accesses the resources available and the like. The graphical user interface may be designed to capture this information which may include one or more graphical locator and/or cursor facilities allowing entity/user to interact with data displayed; for instance, and without limitation, using a touchscreen, touchpad, mouse, keyboard, and/or other manual data entry device. In a non-limiting example, user interface may be displayed on user input device as described above. User/entity may input user input through a graphical user interface on user input device. Such interaction may be enabled via the touch screen. Graphical user interface may include one or more menus and/or panels permitting selection of data such as, without limitation, user/entity data input and the like to be displayed, used, and/or submitted, elements of apparatus 100 to be edited, added, and/or manipulated, options for importation of and/or linking to application programmer interfaces (APIs), exterior services, data source, machine-learning models, and/or algorithms, or the like. Persons skilled in the art, upon reviewing the entirety of this disclosure, will be aware of various ways in which a graphical user interface and/or elements thereof may be implemented and/or used as described in this disclosure.

In an embodiment, and still referring to FIG. 1, receiving low-level entity data 120 may include segmenting entities into categories based on triggers such as the amount of time a user spent on their review of resources. For example, a potential entity/user may receive prewritten and predesigned pieces of correspondence and resources regarding the life insurance coverage program process and a segmentation process may be applied wherein entity/client prospects may be categorized by, for example, "ready now", "not ready", "not ready at all" due to certain triggers such as prospect's behavior. Prospect's behavior may include, receiving the correspondence/resources, opening the resources and reading them, or not opening the resources at all. For example, if the prospective client opens and consumes 25% of content then the system may track that information and relay it to advisor with a notification stating, "client has opened the correspondence and read 25% of it". A machine learning model may determine if prospective client meets a threshold, and prospective client may then be opted into the "Client Eco-System" and guided through the online platform, where more data is gathered relating to the prospective client/entity. Once the prospective client/user has been opted into the "Client Eco-System" high-level entity data 124 is gathered. "High-level entity data" as used in this disclosure is defined as data pertaining to the entity, collected over time by the computer device through one or more ongoing interactions between available resources and the entity via various means such as, by obtaining data from the entity/user by the entity input 116. In another embodiment, the data collected may be obtained by tracking resource metadata such as using a web counter or any analytic tool to record click tracking, scroll tracking, viewing session length-of-time by the entity and the like. In yet another embodiment, the data collected may be obtained by an interface recording, such as a processor which may record/log the movement of the entity's mouse cursor and detect when and for how long it hovers over specific elements of the resources. In another embodiment, the data collected may be obtained by an event handler. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In another embodiment, the data collected may be obtained from tracking cookies which are a sample of text dropped onto a browser while an entity/user is viewing a website/resource, this text collects data from a user such as their activity on a website, browsing history, geographic location, and the like. In this instance, the data collected may include data produced by the interaction between the user/entity and the resources including login credentials, saved favorites, and the like and saved as a cookie. In an embodiment, processor 108 may inspect one or more cookies to obtain the data inside to derive high-level entity data 124. In an embodiment, high-level entity data 124 may include data indicating entity's behaviors and behavior patterns within the Client Ecosystem, the entity/user's preferences, or needs. For example, data regarding entity's large amount of time spent reviewing resources related to insurance policy loans. In an embodiment, high-level entity data 124 may also include user/entity response to past insurance programs. In another embodiment, high-level entity data 124 may also include financial performance, and risk factors, such as an entity having a large amount of debt. For example, high-level entity data 124 may also include entity's pecuniary records, historical claim data (e.g., amount of claims entity has filed), health data (e.g., chronic illness diagnosis) and the like. High-level entity data 124 may include a transaction history. "Transaction history" as used in this disclosure is defined as a data structure that includes at least a datum describing at least a previous transaction and transaction history may include a plurality of data describing a plurality of transactions. For example, transaction history may include a running record of all financial transactions logged in a bank, authentication, charge/credit card or investment statement. In an embodiment transaction history may include a historical credit report.

Still referring to FIG. 1, in some cases, high level entity data 124 may include a portion or even entire low-level entity data 120. In an embodiment, high-level entity data 124 may high-level entity data 124 may include occupation information. "Occupation information" as used in this disclosure is defined as information related to an entity/user's job or profession. For example, occupation information may include the user's job title, length of time employed, industry of employment and the like. In another embodiment, high-level entity data 124 may be related to a person and contain personal information. For example, full legal name, social security number, employment identification number and/or individual taxpayer identification number, mailing address, email address, gross annual income, employment status, transactional data, credit report, credit history, phone number, housing costs, account details (i.e., number of savings and checking accounts), assets (i.e., savings, investment, and property), credit cards, debts, loans, car payments, citizenship, residential address and the like. In other embodiments, user data may be related to a business and contain business information. For example, employer information, transactional data of a business, number of years business has been established, number of deposits per month in a business bank account, monthly revenue, average daily bank balance, credit history/report of a business, business registration details, government activity summary, company information (i.e., employees, sales, ownership, and subsidiaries), data relating to business operations, industry classification and data, public filings (i.e., liens, judgments, and UCC filings), past payment history and collections related to a business, number of accounts (i.e., credit, checking, savings), account details, and the like.

Still referencing FIG. 1, computing device 104 may obtain high-level entity data 124 from a smart assessment. As used in this disclosure, a "smart assessment" is a set of questions that asks for a user's information, wherein each question contains answers which influence user authentication, verification, and/or any processing step described in this disclosure. In some cases, a question within the smart assessment may include selecting a selection from plurality of selections as answer. In other cases, questions within the smart assessment may include a free user input as answer. In a non-limiting example, smart assessment may include a question asking the user regarding level of debt they have; for instance, the question may be "Does user/entity have an outstanding mortgage?" In some cases, smart assessment may be in a form such as, without limitation, survey, questionnaire, transactional tracking, interview, report, events monitoring, and the like thereof. In some embodiments, smart assessment may include a data submission of one or more documentations from the user. As used in this disclosure, a "data submission" is an assemblage of data provided by the user as an input source. In a non-limiting example, data submission may include user uploading one or more data collections to processor 108. As used in this disclosure, a "documentation" is a source of information. In some cases, documentation may include electronic documents, such as, without limitation, txt file, JSON file, word document, pdf file, excel sheet, image, video, audio, and the like thereof. In a non-limiting example, documentation may include data collection, and may be input source of data submission for further processing. Further processing may include any processing step described below in this disclosure. Additionally, or alternatively, data collection may include one or more answers of smart assessment. In a non-limiting example, each data object may represent a single question within smart assessment and corresponding answer to the single question.

With continued reference to FIG. 1, in some embodiments, questions within smart assessment may be selected from a pre-defined set of questions, wherein the pre-defined set of questions are questions user specified prior to accepting smart assessment. In some cases, user may be a system administrator. In a non-limiting example, questions of smart assessment may be selected from a question bank, wherein the question bank may include a plurality of example questions. Additionally, or alternatively, processor 108 may be configured to generate smart assessment and/or questions within smart assessment. In some embodiments, smart assessment may include a base question. Base question may be a question from pre-defined set of questions described above. Processor 108 may be configured to generate questions within smart assessment based on the answer to base question.

In an embodiment, high-level entity data 124 may also include information regarding a user's insurance status such as, existing policy data, covered items or people, coverage amounts, premium such as monthly premium, deductible such as yearly deductible, death benefit, loan amounts, loan types, a date or dates related to insurance coverage, and the like. A machine learning model may perform a background history, financial information analysis to determine eligibility and level of risk associated with the potential client (before assigning client to an advisor). For example, the machine learning model such as, without limitation, protocol object machine-learning model as described below, may take into account the potential client's financial history with a survey/questionnaire regarding prospective clients, FICO score, their bank statement information, credit cards issued to the potential cardholder, outstanding personal loans and the like. The FICO score is a person's credit score calculated with software from Fair Isaac Corporation (FICO). In an embodiment, prospective client/user may then receive a fillable, intuitive form which based on the prospective client's answers to first set of questions, the system takes prospective client to the next, tailored series of questions utilizing a feedback mechanism by a machine learning process. The machine learning model may also provide prospective entity/client with a fillable asset form, liabilities form, income form, business ownership question form, current life/health insurance form, key objectives form, health/lifestyle form and the like. In an embodiment, the user may input information via a graphical user interface, which is defined as a form of user interface that allows users to interact with electronic devices through graphical icons and audio indicator such as primary notation, instead of text-based UIs, typed command labels or text navigation. Furthermore, the machine learning model, and the user via the GUI, may manage the program.

Still referencing FIG. 1, apparatus 100 may identify a protocol metric 128 as a function of the degree of interaction. "Protocol metric" as used in this disclosure is defined as qualitative and quantitative measures relating to characteristics. For example, this may include an insurance advisor and the number of years of experience the life insurance advisor has and/or a formal credential such as Certified Financial Planner, Chartered Financial Counselor. Protocol metric 128 may include an expertise metric such as an area of expertise, for example, experience with elderly clients, retirement issues and the like. Protocol metric 128 may also include one or more numerical measurements such as scores, ratings, rankings and the like. In an embodiment, protocol metric 128 may include one or more components of aspects within a protocol object that contribute to the overall structures and/or operations of the executable data structures (i.e., life insurance policy coverage plan) for example a life insurance policy limit, a premium and the like. This is further detailed in FIG. 2, the protocol metric database 200 which may include years of experience data 204, credential data 208 and area of expertise data 212.

Still referring to FIG. 1, apparatus 100 may determine a protocol object 136 as a function of the high-level entity data 124 and the protocol metric 128. "Protocol object" as used in this disclosure is defined as a professional who provides specialized guidance and advice for investment in various insurance schemes. For example, a life insurance advisor may provide advice to clients on retirement planning, investing, and protecting against risks. Insurance advisors may also complete a financial needs analysis with clients, which may include assets and liabilities, tax status, existing insurance and risk analysis. Protocol object 136 may also include a specific insurance coverage policy configured which may be utilized at a later time to create the executable data structures. This may include any computer program, machine-learning model or data store necessary for creating the executable data structure. For example, protocol object 136 may include a chatbot designed based on the protocol metric 128 to serve as an insurance advisor. In an embodiment, protocol object 136 may include a chatbot which may be generated by a machine learning model, which is further described below. As used in the current disclosure, a "chatbot" is a computer program designed to simulate conversation with entities/users. A chatbot may accomplish this by presenting the entity with questions. Record datum may be generated as a function of the job candidate responds. In the embodiments, a chatbot is designed to convincingly simulate the way a human would behave/respond as a conversational partner. A machine learning model may be configured to generate chatbot responses as a function of the record datum as an input and output additional questions. In an embodiment, a chatbot may be configured to ask the questions from the questionnaire to an entity/user. Chatbot questions may also be generated as a function of the entity/user input. Additionally, a chatbot may be configured to respond to the entity based on the entity's responses. In other embodiments, a chatbot may prompt the user to respond to the questions in text or a video format.

In an embodiment, and still referring to FIG. 1, the determination of the protocol object 136 may include the implementation of a classifier and/or a machine-learning process/module that determines a similarity score. A "classifier," as used in this disclosure is a machine-learning model, such as a mathematical model, neural net, or program generated by a machine learning algorithm known as a "classification algorithm," and described in further detail below. In an embodiment, determining the protocol object 136 may include utilizing a protocol object machine learning model which may include receiving protocol object training data comprising a plurality of entity data, such as high-level entity data 124 from the user entity input 116, as input correlated to a plurality of protocol objects as output generating a protocol object machine-learning model by training the protocol object machine-learning model using the protocol object training data and determining the protocol object using the protocol object machine-learning model.

Training data may include, or retrieved from a database of protocol metrics 128 and high-level entity data 124. Machine-learning module may perform determinations, classification, and/or analysis steps, methods, processes, or the like as described in this disclosure using machine learning processes. In one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure. For example, training data inputs may be user comprehensive data and outputs may be a determination of a match or not. In other embodiments, machine-learning module may obtain a training set by querying a communicatively connected database that includes past inputs and outputs. Training data may include inputs from various types of databases, resources, and/or entity inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Data may include previous outputs such that the retrained machine-learning module 132 iteratively produces outputs, thus creating a feedback loop. For example, an input may include the high-level entity data and an output may include a determination of protocol object 136. In an embodiment, digital signatures or other cryptographic techniques may be utilized to verify clients.

In an embodiment, and still referring to FIG. 1, entity input 116 may include, but is not limited to text input, engagement with icons of a graphical user interface (GUI), and the like. Text input may include, without limitation, entry of characters, words, strings, symbols, and the like. In some embodiments, entity input 116 may include one or more interactions with one or more elements of a graphical user interface (GUI). A "graphical user interface" as used in this disclosure is an interface including set of one or more pictorial and/or graphical icons corresponding to one or more computer actions. GUI may be configured to receive entity input 116. GUI may include one or more event handlers as described above. Event handlers may be programmed for specific entity input, such as, but not limited to, mouse clicks, mouse hovering, touchscreen input, keystrokes, and the like. For instance, and without limitation, an event handler may be programmed to generate a pop-up window if a user double clicks on a specific icon. Entity input 116 may include, a manipulation of computer icons, such as, but not limited to, clicking, selecting, dragging and dropping, scrolling, and the like. In some embodiments, entity input 116 may include an entry of characters and/or symbols in an entity input field. An "entity input field" as used in this disclosure is a portion of graphical user interface configured to receive data from an individual. An entity input field may include, but is not limited to, text boxes, search fields, filtering fields, and the like. In some embodiments, entity input 116 may include touch input. Touch input may include, but is not limited to, single taps, double taps, triple taps, long presses, swiping gestures, and the like. In some embodiments, GUI may be displayed on, without limitation, monitors, smartphones, tablets, vehicle displays, and the like. One of ordinary skill in the art upon reading this disclosure will appreciate the various ways a user may interact with a graphical user interface.

Still referring to FIG. 1, apparatus 100 may establish an executable data structure 140 for the entity as a function of the protocol object 136. "Executable data structure" as used in this disclosure, is a digital representation of a set of data elements specific to insurance-related information that can be processed and utilized by a computing device. In an embodiment, executable data structure 140 may include one or more operations by protocol object 136 which may include a premium calculation which includes the price to pay to purchase an insurance coverage policy. In another embodiment, executable data structure 140 may include one or more operations by the protocol object 136 which includes insurance policy coverage details such as coverage in case of death from natural causes or accidents. In an embodiment, executable data structure may include at least one policy object (i.e., an individual policy that has been issued or is available for issuance by an insurer or assurer); for instance, and without limitation, at least one policy object may include a life insurance policy. "Life insurance policy" as used in this disclosure is defined as a contract between an insurance policy holder and an insurer or assurer, where the insurer promises to pay a designated beneficiary a sum of money upon the death of an insured person after the execution of executable data structure. Depending on the contract, other events such as terminal illness or critical illness may also trigger the execution of executable data structure. For example, and without limitation, a policy object may consist of a term policy object, permanent policy object, and the like. "Term policy object" as used in this disclosure is defined as life insurance that provides coverage at a fixed rate of payments for a limited period of time, the relevant term. "Permanent policy object" as used in this disclosure is defined as life insurance to provide protection throughout the entire life of an entity/user. In an embodiment, the executable data structure for an entity may represent a data structure comprising a pecuniary advance. A "pecuniary advance" as used in this disclosure is defined as a transfer of money by one party to another with an agreement to pay it back, wherein the recipient, or borrower, incurs a debt and is usually required to pay interest for the use of the money. In an embodiment, an executable data structure 140 may include an optimal life insurance policy coverage plan. An "optimal life insurance policy coverage plan" as used in this disclosure is defined as the best matched contract for both the insurance policy holder/user/entity and an insurance company, where the insurer promises to pay a sum of money in exchange for a premium, upon the death of an insured person/user or after a set period, based on entity/user's high-level entity data 124. For example, an entity may input the need for a new vehicle based on the high-level entity data 124 which would be the best match for an insurance policy coverage plan which includes a policy loan feature. For example, an insurance coverage policy may include various features such as, a policy may accrue to $100,000 with a death benefit of 1 million dollars and if entity/client needs a new vehicle, they can secure a "policy loan", having a $100,000 cash value, and policy owner can borrow against 90% of that amount by an unstructured loan, wherein the loan is issued, and the cash value remains at $100,000. The policy owner can then purchase a new car and they own the car, and the lien for the loan balance is on the death benefit wherein the owner is in charge of repayment.

With continued reference to FIG. 1, in an embodiment, establishing an executable data structure 140 for an entity may be accomplished by utilizing an executable data structure machine learning model which includes receiving executable data structure training data comprising high-level entity data 124 as input correlated to a plurality of executable data structures as output, generating an executable data structure machine learning model by training the executable data structure machine learning model using the executable data structure training data and establishing the executable data structure 140 for an entity using the executable data structure machine learning model. Executable data structure machine learning model may be supervised and may be trained with training data. Training data may include high-level entity data 124. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language. In one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure. In other embodiments, machine-learning module may obtain a training set by querying a communicatively connected database that includes past inputs and outputs. Training data may include inputs from various types of databases, resources, and/or entity inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Data may include previous outputs such that executable data structure machine-learning module iteratively produces outputs, thus creating a feedback loop. For example, training data may include inputs including high-level entity training data 124 and protocol metrics 128 correlated to outputs including an executable data structure 140.

Still referring to FIG. 1, apparatus 100 and/or another device may generate a classifier using a classification algorithm, wherein "classification algorithm" is defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of attribute data.

Still referring to FIG. 1, apparatus 100 may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as P (A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A Naïve Bayes algorithm may be generated by first transforming training data into a frequency table. A computing device may then calculate a likelihood table by calculating probabilities of different data entries and classification labels. A computing device may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 1, apparatus 100 may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements. With continued reference to FIG. 1, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of attribute data, key words and/or phrases, or the like, to clusters representing themes.

In an embodiment, and still referring to FIG. 1, the machine-learning model may also check for updates to high-level entity data 124. The processor 108 may provide updated high-level entity data 124 if applicable. For example, the entity/user may pay off various outstanding personal loans and therefore the high-level entity data 124 may be updated based on this new information. The updated information may be updated periodically, such as monthly, daily or weekly. For example, processor 108 may query a database for the updated data, for example when there is a drop in user credit score and the like.

With continued reference to FIG. 1, apparatus 100 may further include a display communicatively connected to at least a processor 108. "Display" for the purposes of this disclosure is a device configured to show visual information. In some cases, display may include a liquid crystal display (LCD), a cathode ray tube (CRT), a plasma display, a light emitting diode (LED) display, and any combinations thereof. Display may include a display device. Display device may include, but is not limited to, a smartphone, tablet, laptop, monitor, tablet, and the like. Display device may include a separate device that includes a transparent screen configured to display computer generated images and/or information. In some cases, display may be configured to present GUI to a user, wherein a user may interact with GUI. In some cases, a user may view GUI through display.

Figure 2:
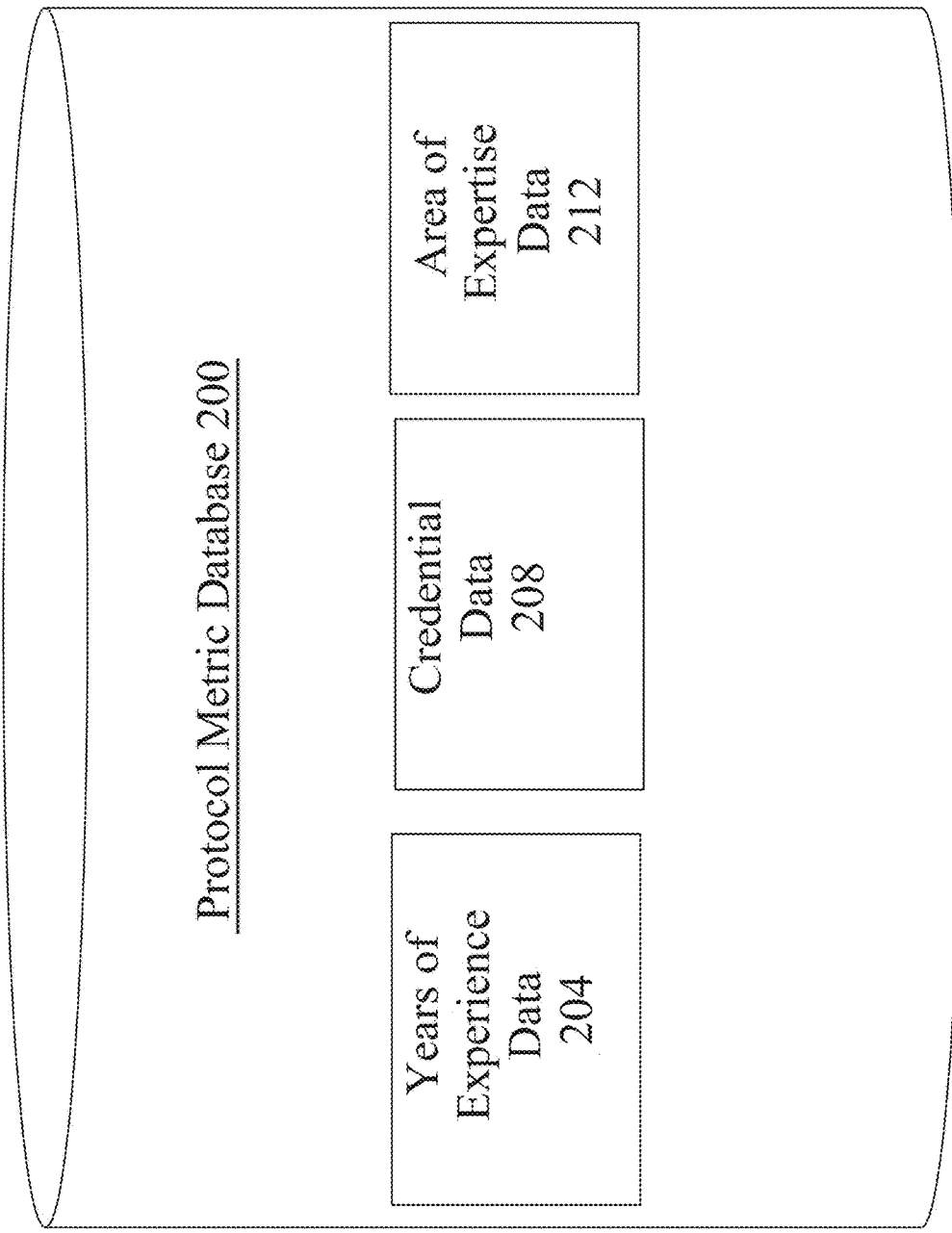
FIG. 2 is an illustration of an exemplary embodiment of a database.

Now referencing FIG. 2, an illustration of an exemplary embodiment of a database 200 is presented. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, in some embodiments, protocol metric database 200 may include years of experience data 204. "Years of experience" as used in this disclosure is defined as the number of years a professional has in a relevant field. For example, years of experience data 204 may include, without limitation, 10 years of experience an insurance advisor has in the insurance field. Database 200 may also include credential data 208. "Credential data" as used in this disclosure is defined as a qualification, achievement, or aspect of a person's background, typically when used to indicate that they are suitable for something. Credential data 208 may include, without limitation, a formal credential such as a Certified Financial Planner, Chartered Financial Counselor that the insurance advisor may have achieved. Database 200 may also include area of expertise data 212. "Area of expertise" as used in this disclosure is defined as a specialized form of knowledge in a particular field. For example, an area of expertise data 212 may include, without limitation, the area that the insurance advisor has experience in such as retirement issues, elder client needs and the like. Any and all determinations described above may be performed and analyzed using an optimization program.

Returning to FIG. 1, processor 108 may compute a weight associated with the protocol metric 128 by a minimal and/or maximal score; a mathematical function, described herein as an "objective function," may be used by processor 108 to score each possible pairing. Objective function may be based on one or more objectives as described below. In various embodiments a score of a particular protocol metric 128 may be based on a combination of one or more factors. Each factor may be assigned a score based on predetermined variables. In some embodiments, the assigned scores may be weighted or unweighted. Processor 108 may compute a score associated with each of the protocol metrics 128 and the like.

Still referring to FIG. 1, apparatus 100 may generate an objective function. An "objective function" as used in this disclosure is a process of minimizing or maximizing one or more values based on a set of parameters. In some embodiments, an objective function of apparatus 100 may include an optimization criterion. For example, an optimization criterion may be a threshold. An optimization criterion may include any description of a desired value or range of values for one or more attributes; desired value or range of values may include a maximal or minimal value, a range between maximal or minimal values, or an instruction to maximize or minimize an attribute. As a non-limiting example, an optimization criterion may specify that an attribute should be within a 1% difference of an attribute criterion. An optimization criterion may alternatively request that an attribute be greater than a certain value. An optimization criterion may specify one or more tolerances for precision in a matching of attributes to improvement thresholds. An optimization criterion may specify one or more desired attribute criteria for a matching process. In an embodiment, an optimization criterion may assign weights to different attributes or values associated with attributes. One or more weights may be expressions of value to a user of a particular outcome, attribute value, or other facet of a matching process. Optimization criteria may be combined in weighted or unweighted combinations into a function reflecting an overall outcome desired by a user; function may be an attribute function to be minimized and/or maximized. A function may be defined by reference to attribute criteria constraints and/or weighted aggregation thereof as provided by apparatus 100; for instance, an attribute function combining optimization criteria may seek to minimize or maximize a function of improvement threshold matching.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score attributes as described above, calculate an output of mathematical expression using the variables, and select a pairing that produces an output having the lowest size, according to a given definition of "size," of the set of outputs representing each of plurality of candidate improvement thresholds; size may, for instance, included absolute value, numerical size, or the like. Selection of different loss functions may result in identification of different potential pairings as generating minimal outputs. Objectives represented in an objective function and/or loss function may include minimization of differences between attributes and improvement thresholds.

Optimization of objective function may include performing a greedy algorithm process. A "greedy algorithm" is defined as an algorithm that selects locally optimal choices, which may or may not generate a globally optimal solution. For instance, processor 104 may select specific parameters so that scores associated therewith are the best score.

Still referring to FIG. 1, objective function may be formulated as a linear objective function, which processor 104 may solve using a linear program such as without limitation a mixed-integer program. A "linear program," as used in this disclosure, is a program that optimizes a linear objective function. In various embodiments, apparatus 100 may determine a threshold that maximizes a total score subject to a parameter. A mathematical solver may be implemented to solve for the set construction and geographical constraints that maximizes scores; mathematical solver may be implemented on processor 104 and/or another device in apparatus 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, processor 104 may assign variables relating to a set of parameters, which may correspond to score components as described above, calculate an output of mathematical expression using the variables, and select a construction constraint that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referencing FIG. 1, apparatus 100 may further be configured to provide user access to a client portal once user/entity obtains the established executable data structure 140. For example, the client portal may provide a coaching, education, and mentoring program. Client portal may include learning how to access a policy loan, how to track it, advantages of their tailored policy, and various video-based tutorial/example-based content.

Still referring to FIG. 1, in some embodiments, apparatus 100 may be configured to rank entity input 116 as a function of a ranking criterion. A "ranking criterion" as used in this disclosure is a value or values that determine a priority of one or more elements. A ranking criterion may include, but is not limited to, whole numbers, percentages, decimal values, and the like. Apparatus 100 may determine a ranking criterion based on the importance of one or more attributes of entity input 116. For instance, and without limitation, apparatus 100 may rank entity input 116 in order of least important to most important. In other embodiments, apparatus 100 may rank entity input 116 in order of most important to least important, without limitation.

Still referring to FIG. 1, processor 108 may engage in web searching and/or web crawling to obtain this obtain entity input 116 including, without limitation, low-level entity data 120 and high-level entity data 124. "Web crawling" as used in this disclosure is defined as an internet bot that systematically browses the World Wide Web and is typically operated by search engines for the purposes of web indexing. Web crawling may include checking related websites and other sources of information that may indicate clues in reference to building codes, for example a query may include a web crawler function. A query may be configured to search for one or more keywords, key phrases, and the like. A keyword may be used by a query to filter potential results from a query. As a non-limiting example, a keyword may include "kinetics". A query may be configured to generate one or more key words and/or phrases as a function of entity input 116. A query may give a weight to one or more attributes of entity input 116. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicate that the weighted value makes up 20% of the total value. In some embodiments, a query may pair one or more weighted values to one or more attributes of entity input 116. Weighted values may be tuned through a machine-learning model, such as any machine learning model described throughout this disclosure, without limitation. In some embodiments, a query may generate weighted values based on prior queries. In some embodiments, a query may be configured to filter out one or more "stop words" that may not convey meaning, such as "of," "a," "an," "the," or the like.

Still referring to FIG. 1, a query may include a search index. A "search index" as used in this disclosure is a data structure that is configured to compare and/or match data. A search index may be used to link two or more data elements of a database. A search index may enable faster lookup times by linking similar data elements, such as attributes. In some embodiments, apparatus 100 and/or a query may generate an index classifier. An index classifier may include a classifier configured to input attributes and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, a computing device may be configured to generate a web search query based on a freshness and/or age of a query result. A freshness may include an accuracy of a query result. An age may include a metric of how outdated a query result may be. In some embodiments, a computing device may generate a web crawler configured to search the Internet for attributes.

In an embodiment, and still referring to FIG. 1, apparatus 100 may generate a new threshold using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of attribute data, as defined above, with each other. As a non-limiting example, a feature learning algorithm may detect co-occurrences of attribute data, as defined above, with each other. Apparatus 100 may perform a feature learning algorithm by dividing attribute data from a given source into various sub-combinations of such data to create attribute data sets as described above and evaluate which attribute data sets tend to co-occur with which other attribute data sets. In an embodiment, a first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of attribute data with multiple entity skill levels, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified attribute data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related attribute data, which may be provided with improvement thresholds; this may, for instance, generate an initial set of improvement thresholds from an initial set of attribute data of a large number of users, and may also, upon subsequent iterations, identify new clusters to be provided new improvement threshold to which additional attribute data may be classified, or to which previously used attribute data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\mathrm{argmin}_{c_i \ni C}\ \mathrm{dist}(c_i, x)^2$, where argmin includes argument of the minimum, ci includes a collection of centroids in a set C, and dist includes standard Euclidean distance. K-means clustering module may then recompute centroids by taking tmean of all cluster data entries assigned to a centroid's cluster. This may be calculated based on $c_i = 1/|S_i| \Sigma x_{i_3} S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected attribute data set. Degree of similarity index value may indicate how close a particular combination of attribute data is to being classified by k-means algorithm to a particular cluster. K-means clustering algorithm may evaluate the distances of the combination of attribute data levels to the k-number of clusters output by k-means clustering algorithm. Short distances between a set of attribute data and a cluster may indicate a higher degree of similarity between the set of attribute data and a particular cluster. Longer distances between a set of attribute data and a cluster may indicate a lower degree of similarity between an attribute data set and a particular cluster. With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an attribute data set and the data entry cluster. Alternatively or additionally k-means clustering algorithm may select a plurality of clusters having low degree of similarity index values to attribute data sets, indicative of greater degrees of similarity. Degree of similarity index values may be compared to a threshold number indicating a minimal degree of relatedness suitable for inclusion of a set of attribute data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Figure 3:
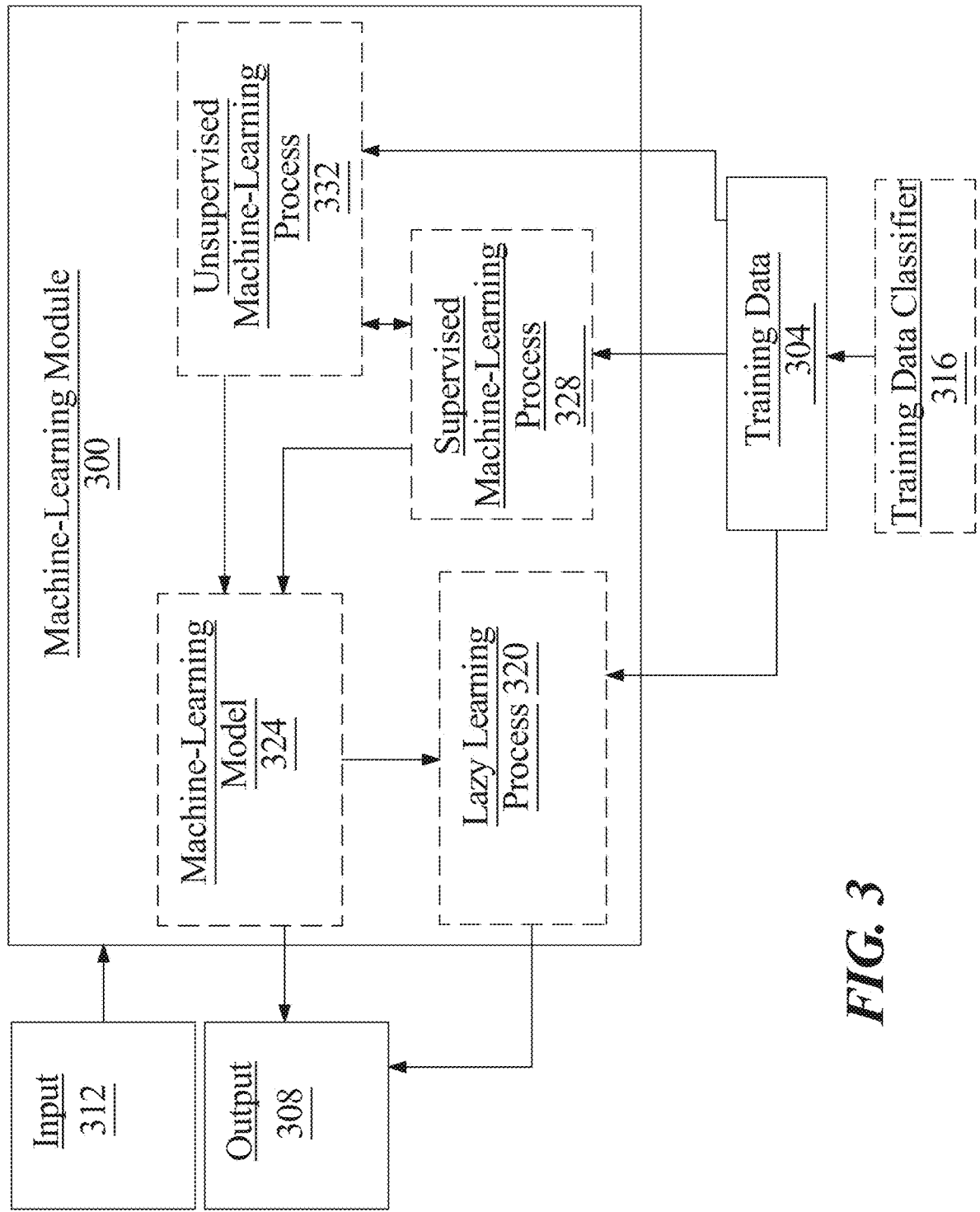
FIG. 3 is a diagram of an exemplary embodiment of a machine-learning module.

Referring now to FIG. 3, a diagram of an exemplary embodiment of a machine-learning module is presented. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
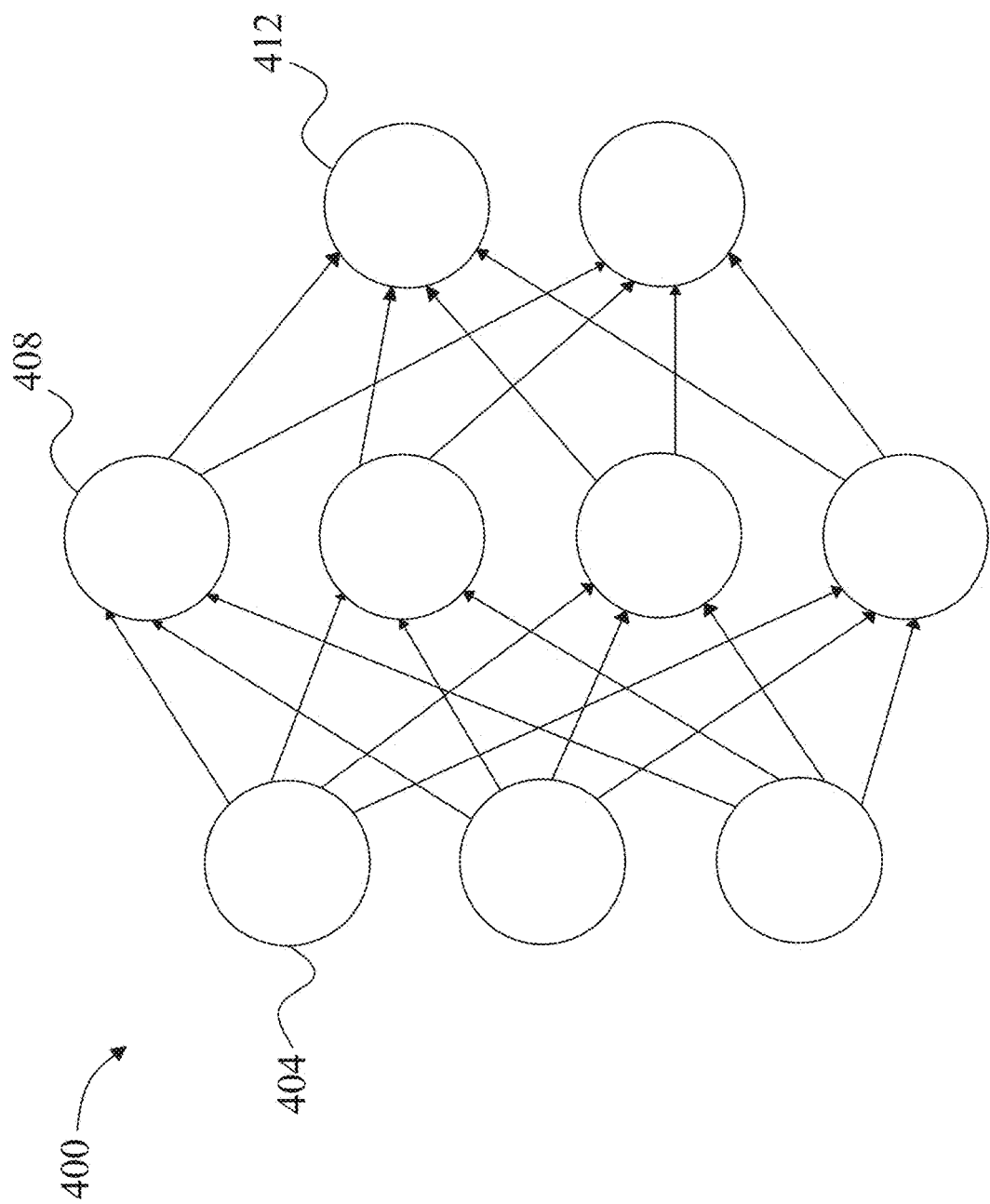
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
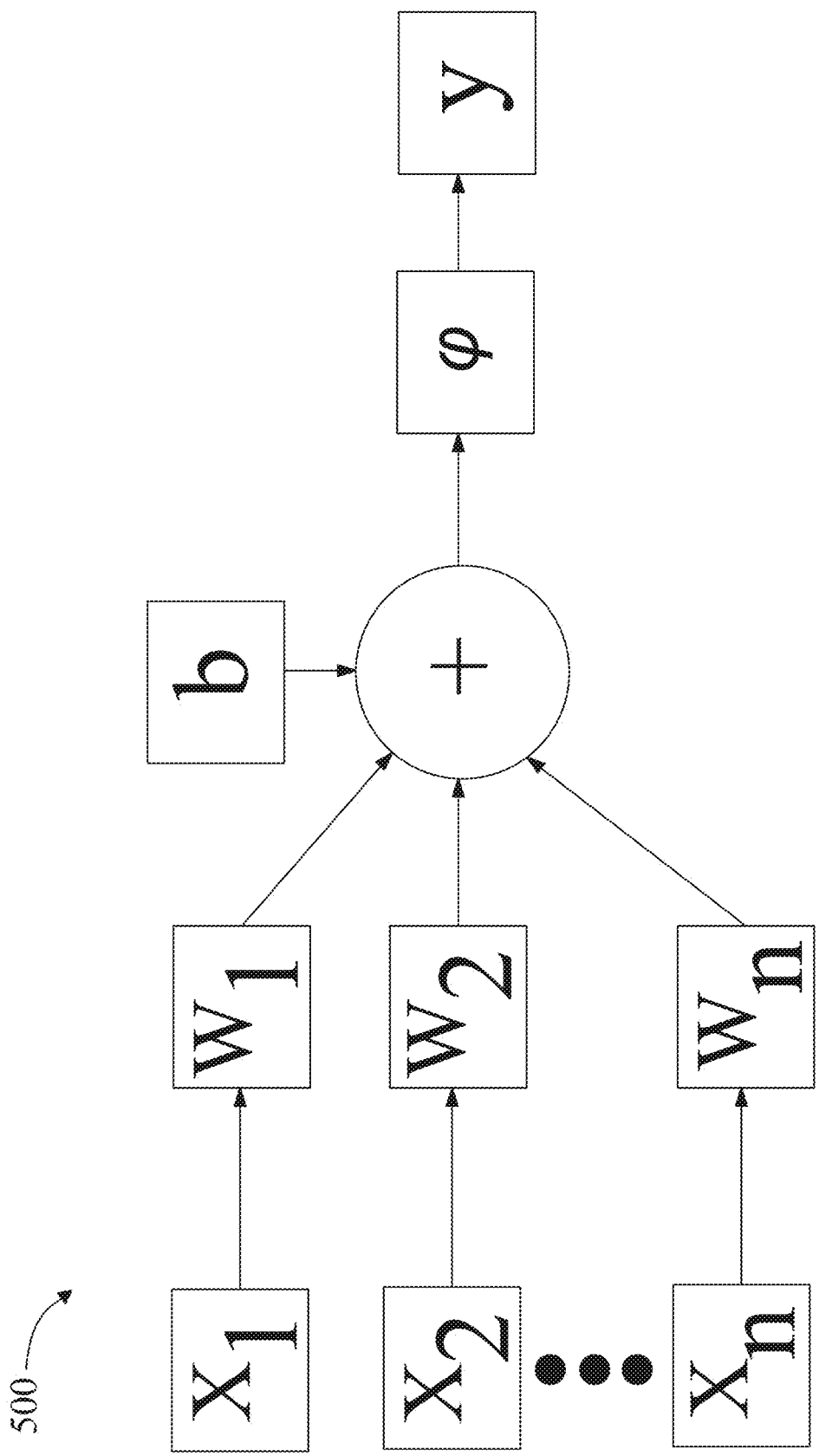
FIG. 5 is a diagram of an exemplary embodiment of a node of a neural network.

Referring now to FIG. 5, an exemplary embodiment 500 of a node of a neural network is illustrated. A node may include, without limitation a plurality of inputs xi that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
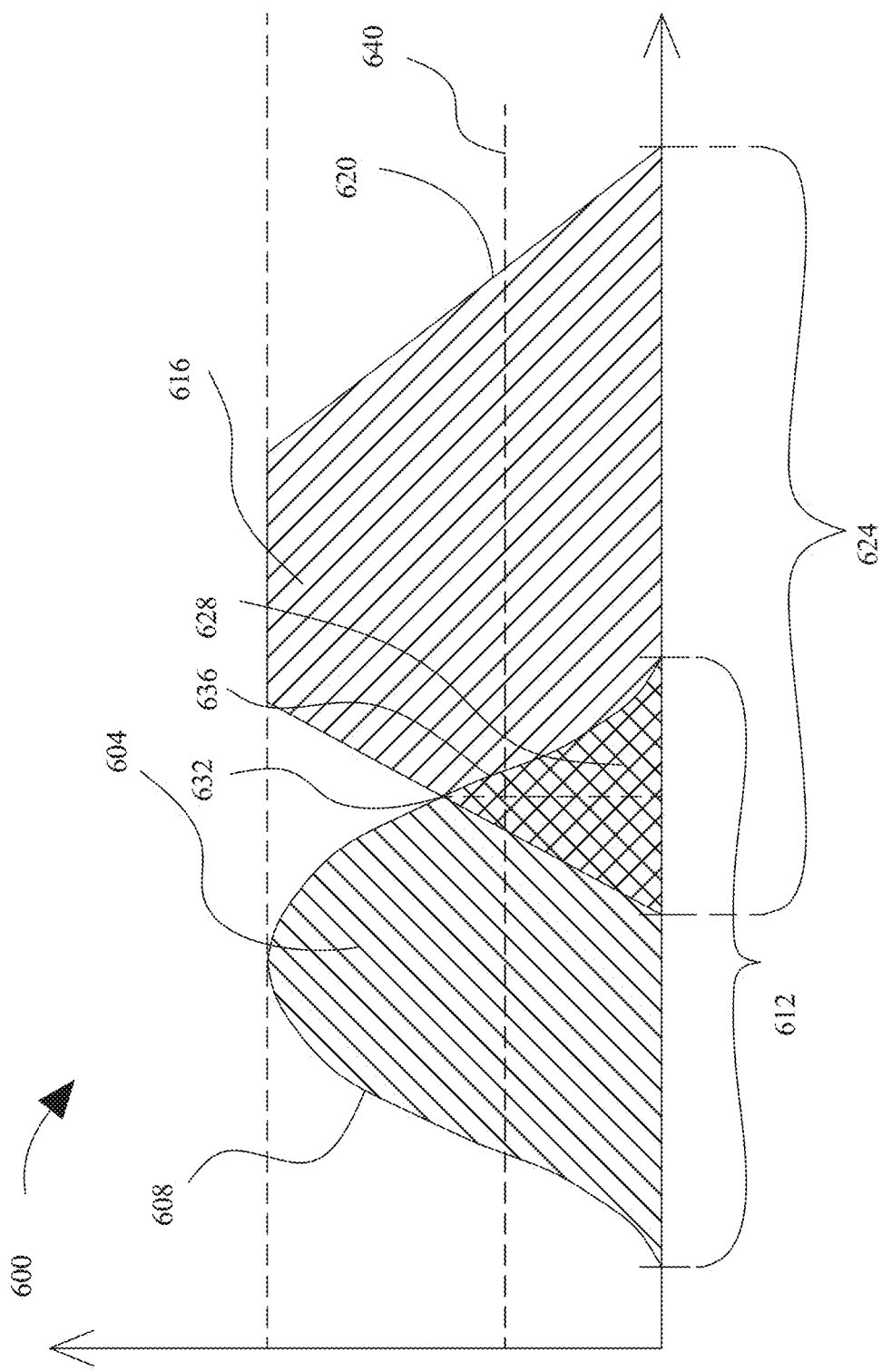
FIG. 6 is a diagram of an exemplary embodiment of a fuzzy set comparison.

Referring to FIG. 6, an exemplary embodiment of fuzzy set comparison 600 is illustrated. This system may be implemented by inputting multiple potentially subjective determinations related to constraints which are represented as fuzzy sets and get output a probability distribution indicating likelihood that the compliance will be under the threshold, a degree to which it is over or under or a yes/no determination. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and a predetermined class, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a biofeedback signal with a user state. For instance, if a biofeedback signal has a fuzzy set matching a user state fuzzy set by having a degree of overlap exceeding a threshold, computing device 104 may classify the biofeedback signal as belonging to the user state. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a biofeedback signal may be compared to multiple user state fuzzy sets. For instance, biofeedback signal may be represented by a fuzzy set that is compared to each of the multiple user state fuzzy sets; and a degree of overlap exceeding a threshold between the biofeedback signal fuzzy set and any of the multiple user state fuzzy sets may cause computing device 104 to classify the biofeedback signal as belonging to a user state. For instance, in one embodiment there may be two user state fuzzy sets, representing respectively an attentive state and an inattentive state. Attentive state may have an attentive state fuzzy set; inattentive state may have an inattentive state fuzzy set; and biofeedback signal may have a biofeedback fuzzy set. Computing device 104, for example, may compare a biofeedback fuzzy set with each of attentive state fuzzy set and inattentive state fuzzy set, as described above, and classify a biofeedback signal to either, both, or neither of attentive state or inattentive state. Machine-learning methods as described throughout may, in a non-limiting example, generate coefficients used in fuzzy set equations as described above, such as without limitation x, c, and σ of a Gaussian set as described above, as outputs of machine-learning methods. Likewise, biofeedback signal may be used indirectly to determine a fuzzy set, as biofeedback fuzzy set may be derived from outputs of one or more machine-learning models that take the biofeedback signal directly or indirectly as inputs.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
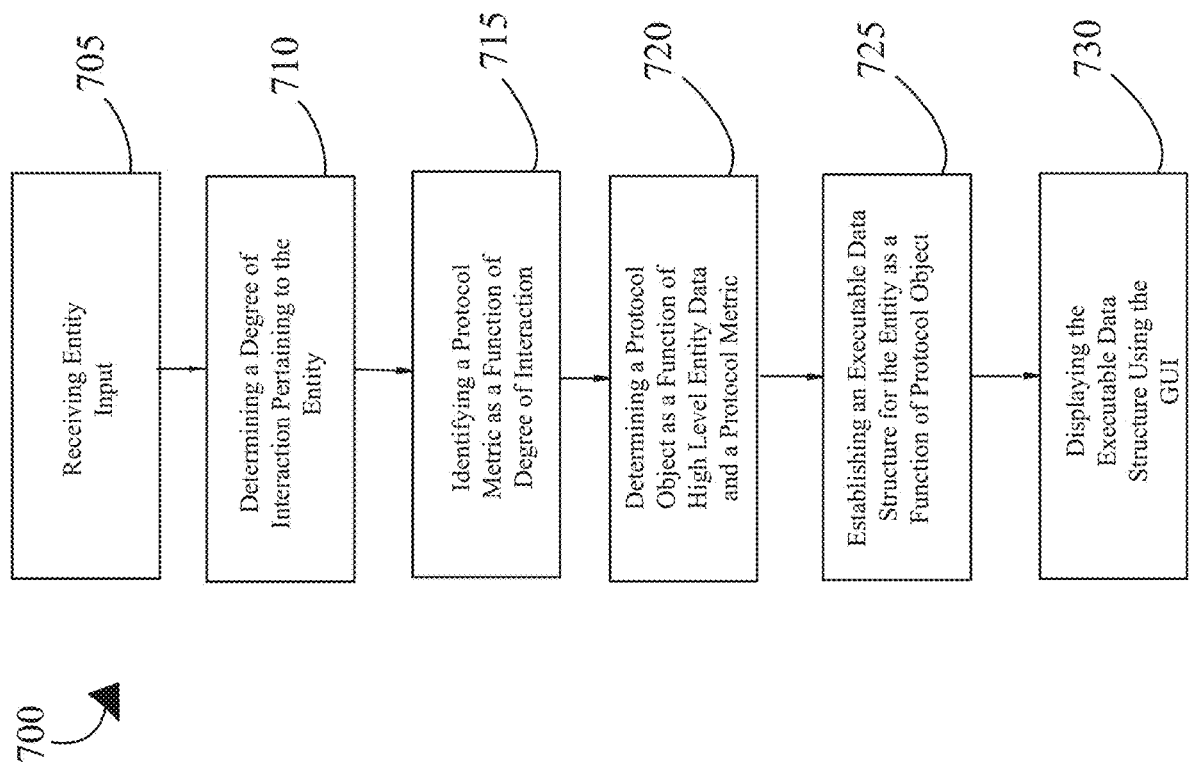
FIG. 7 is a flowchart of a method of a method for classifying an entity to an executable data structure.

Referring now to FIG. 7, a method 700 of using an apparatus for classifying an entity to an executable data structure 140 is illustrated. At step 705, method 700 includes receiving entity input from an entity using a graphical user interface. Receiving the entity input further includes receiving low-level data 120 at a first time which may include a segmentation process wherein entities/users are categorized into groups based on triggers comprising the amount of time user may have spent on review of resources. Method 700 also includes receiving high-level entity data 124 at a subsequent time which may include entity pecuniary records. Entity data may be received through entity input, from external computing devices, such as a remote device, and the like. This step may be implemented as described above in FIGS. 1-6, without limitation.

Still referring to FIG. 7, at step 710, method 700 includes determining, by the at least a processor, a degree of interaction pertaining to the entity by comparing the low-level entity data 120 to the high-level entity data 124. The high-level entity data may include entity pecuniary records. This step may be implemented as described above in FIGS. 1-6, without limitation.

Still referring to FIG. 7, at step 715, method 700 includes identifying a protocol object 136 as a function of the degree of interaction. This step may be implemented as described above in FIGS. 1-6, without limitation.

Still referring to FIG. 7, at step 720, method 700 includes determining a protocol object 136 as a function of the high-level entity data 124 and the at least a protocol metric 128. Determining the protocol object may include receiving protocol object training data comprising a plurality of entity data as input correlated to a plurality of protocol objects as output and generating a protocol object machine-learning model by training the protocol object machine-learning model using the protocol object training data and determining the protocol object using the trained protocol object machine-learning model. This step may be implemented as described above in FIGS. 1-6, without limitation.

Still referring to FIG. 7, at step 725, method 700 includes establishing an executable data structure 140 for the entity as a function of the protocol object 136. Establishing an executable data structure 140 for an entity may include utilizing an executable data structure machine learning model which includes receiving executable data structure training data comprising high-level entity data as input correlated to a plurality of executable data structures as output, generating an executable data structure machine learning model by training the executable data structure machine learning model using the executable data structure training data; and establishing the executable data structure for an entity using the trained executable data structure machine learning model. This step may be implemented as described above in FIGS. 1-6, without limitation.

Still referring to FIG. 7, at step 730, method 700 includes displaying the executable data structure using the graphical user interface. This step may be implemented as described above in FIGS. 1-6, without limitation.

Figure 8:
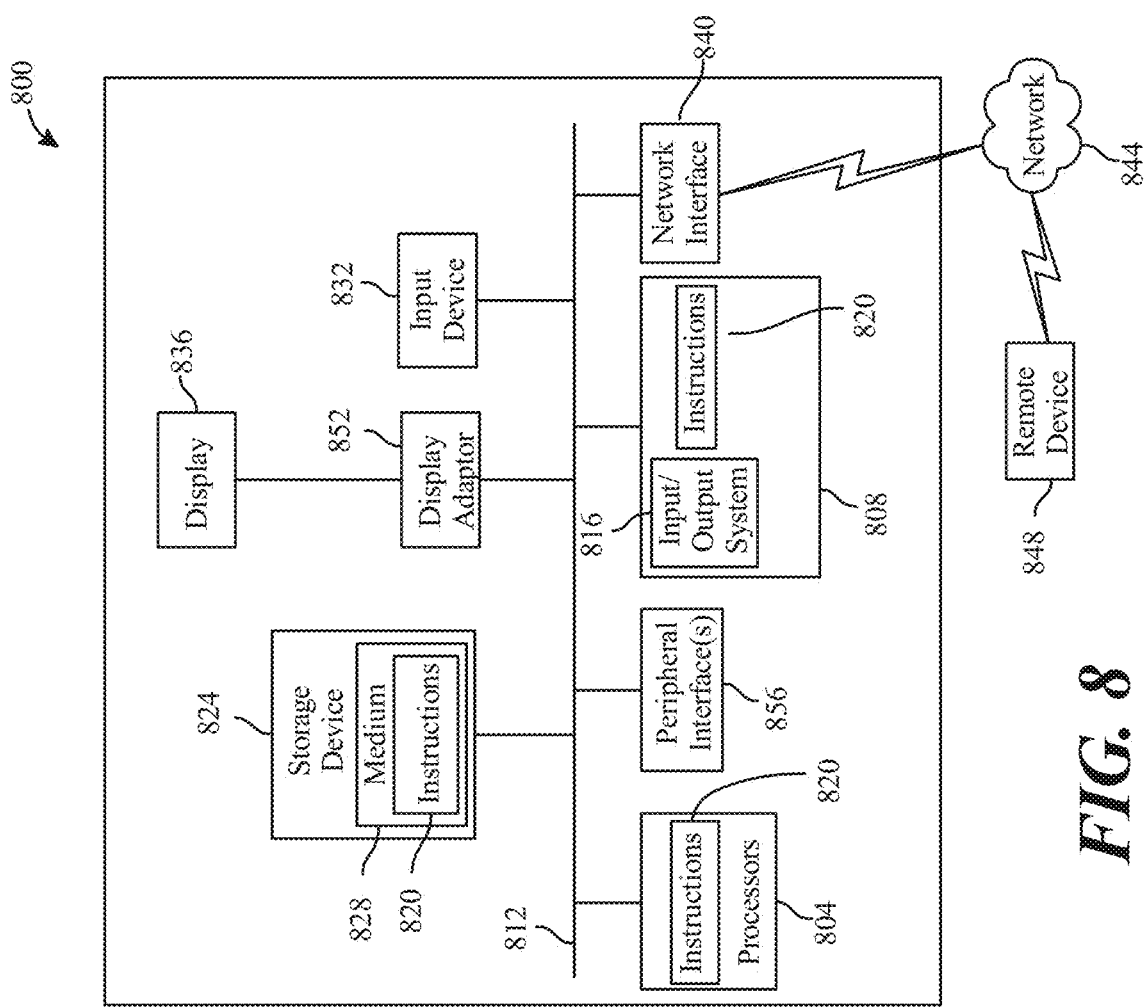
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components hereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for classifying an entity to an executable data structure, the apparatus comprising:
   at least a processor; and a memory communicatively connected to the at least a processor, the memory containing instructions configuring the at least a processor to:
   receive entity input from an entity using a graphical user interface, wherein receiving the entity input comprises:
   receiving a low-level entity data at a first time;
   and receiving a high-level entity data at a subsequent time, wherein the high-level entity data is received using a smart assessment, wherein the smart assessment comprises a base question and at least an additional question generated as a function of a response to the base question;
   determine a degree of interaction pertaining to the entity by comparing the low-level entity data to the high-level entity data;
   identify at least a protocol metric as a function of a degree of interaction, wherein the protocol metric comprises an expertise metric, and an objective function including an optimization criterion to compute a weighted score associated with the protocol metric;
   determine a protocol object, wherein the protocol object includes a chatbot generated by a machine learning model configured to generate chatbot responses as a function of record datum as an input and output additional questions to the entity, as a function of the high-level entity data and the at least a protocol metric using a protocol object machine learning model which comprises:
   receiving protocol object training data, wherein the training data correlates a plurality of high-level entity data as inputs to a plurality of protocol objects data as outputs;
   training, iteratively, the protocol object machine learning model using the protocol object training data, wherein training the protocol object machine learning model includes retraining the protocol object machine learning model with feedback from previous iterations of the protocol object machine learning model;
   and determining the protocol object using the trained protocol object machine learning model;
   establish an executable data structure for the entity as a function of the protocol object wherein establishing an executable data structure comprises generating an executable data structure machine learning model wherein generating the executable data structure machine learning model comprises:
   receiving executable data structure training data comprising the protocol object as input correlated to a plurality of executable data structures as output;
   iteratively training the executable data structure machine learning model using the executable data structure training data;
   display the executable data structure using the graphical user interface;
   and provide client portal access based on the executable data structure to the entity.

2. The apparatus of claim 1, wherein receiving the low-level entity data comprises segmenting entities into categories as a function of a plurality of entity categories.

3. The apparatus of claim 1, wherein determining the degree of interaction comprises determining the degree of interaction as a function of a number of entity access.

4. The apparatus of claim 1, wherein the high-level entity data comprises entity pecuniary records.

5. The apparatus of claim 1, wherein the low-level entity data comprises background entity information.

6. The apparatus of claim 1, wherein the protocol metric comprises an area of expertise metric.

7. The apparatus of claim 1, wherein the executable data structure comprises a pecuniary advance.

8. A method for classifying an entity to an executable data structure, the method comprising:
   receiving, by at least a processor, entity input from an entity using a graphical user interface, wherein receiving the entity input comprises:
   receiving a low-level entity data at a first time;
   and receiving a high-level entity data at a subsequent time, wherein the high-level entity data is received using a smart assessment, wherein the smart assessment comprises a base question and at least an additional question generated as a function of a response to the base question;

determining, by the at least a processor, a degree of interaction pertaining to the entity by comparing the low-level entity data to the high-level entity data;

identifying, by the at least a processor, at least a protocol metric as a function of the degree of interaction, wherein the protocol metric comprises an expertise metric, and an objective function including an optimization criterion to compute a weighted score associated with the protocol metric;

determining, by the at least a processor, a protocol object, wherein the protocol object includes a chatbot generated by a machine learning model configured to generate chatbot responses as a function of record datum as an input and output additional questions to the entity, as a function of the high-level entity data and the at least a protocol metric using a protocol object machine learning model which comprises:

receiving protocol object training data, wherein the training data correlates a plurality of high-level entity data as inputs to a plurality of protocol object data as outputs;

training, iteratively, the protocol object machine learning model using the protocol object training data, wherein training the protocol object machine learning model includes retraining the protocol object machine learning model with feedback from previous iterations of the protocol object machine learning model;

and determining the protocol object using the trained protocol object machine learning model;

establishing, by the at least a processor, an executable data structure for the entity as a function of the protocol object wherein establishing an executable data structure comprises generating an executable data structure machine learning model wherein generating the executable data structure machine learning model comprises:

receiving executable data structure training data comprising the protocol object as input correlated to a plurality of executable data structures as output;

iteratively training the executable data structure machine learning model using the executable data structure training data;

displaying the executable data structure using the graphical user interface;

and provide client portal access based on the executable data structure to the entity.

9. The method of claim 8, wherein receiving the low-level entity data comprises segmenting entities into categories as a function of a plurality of entity categories.

10. The method of claim 8, wherein determining the degree of interaction comprises a number of entity access.

11. The method of claim 8, wherein the high-level entity data comprises entity pecuniary records.

12. The method of claim 8, wherein the low-level entity data comprises background entity information.

13. The method of claim 8, wherein the protocol metric comprises an area of expertise metric.

14. The method of claim 8, wherein the executable data structure comprises a pecuniary advance.

* * * * *